Patented Dec. 17, 1946

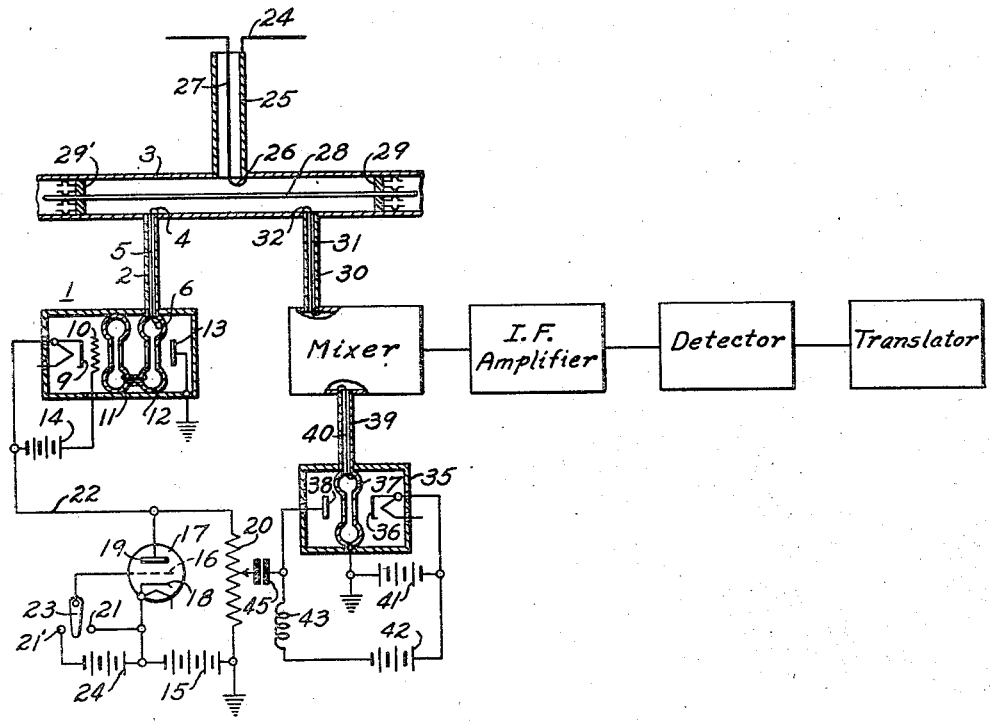

2,412,935

UNITED STATES PATENT OFFICE 2,412,935

SYSTEM FOR CONTROL OF RECEIVER RECEPTION BY AN ASSOCIATED TRANSMITTER

David R. Tashjian, Baltimore, Md., assignor to Westinghouse Electric Corporation, East Pittsburgh, Pa., a corporation of Pennsylvania Application May 25, 1943, Serial No. 488,328

6 Claims. (Cl. 250—13)

This invention relates to high frequency systems, and more particularly, to control means for receivers adversely affected by transmitters operating at the frequency range of the transmitter.

In certain applications in high frequency systems, a transmitter and a receiver may operate from a common energy radiating source. It is highly desirable that while the transmitter is operating, the receiver should not be affected by the relatively high power radiated from the transmitter. This situation commonly occurs in ultra high frequency work where, in a radar system, a receiving circuit is provided for indicating the echo of the transmitted signal. Generally, a single antenna is employed both for transmitting and receiving. The receiver must be made insensitive during the operation of the transmitter, which may be for fractions of a second at rapidly recurrent intervals in order that the leakage voltage of the transmitter impulse shall not block the receiver and prevent its recovery in time for the reception of the echo.

A particular feature of this invention is that means are provided for instantaneously controlling the receptive condition of the receiver without introducing a time lag which would prevent accurate reception of the echo signal.

Another feature of this invention is that the control of the receiver is operable at a pulse rate of the transmitter automatically upon energization of the latter.

A particular advantage of the high frequency control system herein described is that the control of the receiver is effected in the circuit of the local oscillator whereby operating voltages of the amplifying portion of the receiver remain unaffected.

Another advantage of the system in accordance with this invention is that the control between the transmitter and receiver is obtained by a simple circuit utilizing the minimum number of circuit elements.

Other features and advantages will be apparent from the following description of the invention, pointed out in particularity by the appended claims, and taken in connection with the accompanying drawing, in which the single figure shows schematically the control circuit of this invention applied to a high frequency transmitting and receiving system utilizing a common energy radiator and collector.

In high frequency communication systems where a transmitter and a receiver are alternately operated on substantially the same frequency, the means heretofore employed for blocking the receiver while the transmitter is in operation introduced an appreciable time lag. The recovery time of the receiver to a responsive state in various applications does not introduce serious difficulties. Heretofore, in such systems, blocking was effected by introducing a bias voltage which is applied to a suitable point in the amplifying circuit. Other means have been devised which provided a short circuit to the input terminal of the receiver while the transmitter was in operation. The control circuit, in accordance with this invention, is particularly applicable in cases where the receiver must be instantly responsive to signals when operation of the transmitter ceases. In radar work this condition arises very frequently and has been a major problem.

Radar systems essentially employ a transmitter which may be keyed for an extremely short period of time whereby a pulse of microseconds duration must be transmitted and the receiver, operated conjointly therewith, must be instantaneously responsive after each pulse and during the time the next pulse is transmitted, in order to receive the echo of the transmitted pulse. The transmitter in such systems may be keyed at a rapidly following pulse rate, and while the transmitter is energized, the receiver must be insensitive in order that the transmitted pulse shall not overload the receiver so as to block any portion of the receiving circuit, the recovery time of which would fall within the time period of the echo signal.

The invention is described in connection with a radar system in order to illustrate the flexibility of control and its operation in a preferred embodiment. The system is applicable as well to any high frequency transmitting and receiving arrangement wherein the receiver includes a local oscillator, for example, a receiver of the superheterodyne type, and means are provided for controlling the frequency generated by the local oscillator. Only such basic elements of the transmitting and the receiving system are shown which are necessary for an understanding of the operation of the invention. Various modifications may be made, depending upon the type of circuits employed in either the transmitter or the receiver, without departing from the underlying principle of operation, which in its broader aspect, includes the control in frequency of the local oscillator of a superheterodyne receiver automatically upon operation of the transmitter.

Referring to the drawing, the transmitting portion of the system includes an oscillation generator 1 which may be of any type but is here exemplified by a Klystron converter, or similar electron velocity actuated tube, the output of the oscillator is connected by means of a transmission line 2 to a distribution junction comprising the transmission line 3. The coupling is effected by any suitable means such as loop 4 of the inner conductor 5 with respect to the junction 3, and by the loop 6 of the inner conductor 5 with respect to the output circuit of the converter 1. The latter may be of the conventional type, including a cathode 9, a control grid 10, cavity resonators 11 and 12, and anode 13. The operating potential for the control electrode 10 is represented by the battery 14, whereas the operating potential for the anode 13 by the battery 15. The control of the transmitter is effected by controlling the potential applied between electrodes 13 and 9. Various forms of controls may be used, and by way of example, the control in this circuit is obtained from the vacuum tube 17. The cathode 18 thereof connects to the negative terminal of the battery 15, and the anode 19, through the anode load resistor 20 to the positive terminal of the battery 15, which is at ground potential. The anode 13 of the Klystron converter 1 returns also to ground, whereas the cathode 9 is connected by means of the conductor 22 to the anode 19. In this manner, the effective anode potential for the converter is derived from the anode current of the vacuum tube 17 flowing through the resistor 20. The current may be controlled by applying a suitable potential to the grid electrode 16, and for this purpose, there is shown the switch 23 which, in one position engaging the contact 21, connects the grid 16 to the cathode 18 initiating maximum space current conductivity of the tube 17, and in the second position, engaging the contact 21', connects the grid 16 to a bias supply source shown here by the battery 24. The switch 23 may be an electronic device which will cause conductive energization of the vacuum tube 17 at a high pulse rate, that is, for an extremely short duration followed by a blocking of the transmitter for another period of more or less duration.

The output of the transmitter, as stated before, connects to the junction 3 which, in the form of a transmission line, provides a coupling circuit to the radiator comprising the dipole 24. The latter is coupled to the junction 3 through the transmission line 25, the coupling being effected by the loop 26 of the inner conductor 27 of the line 25. The inner conductor 28 of the junction line 3 terminates at both ends by conducting plugs 29 and 29' which may be arranged to slide within the shell of the junction 3, in order to match the impedance thereof to the antenna 24, as well as to the input line 2 from the generator 1. This completes the transmission portion of the system, and while the generator 1 is in operation, the dipole 24 performs the function of the radiator of the oscillations produced whereas when the generator 1 is not in operation to dipole 24, functions as the antenna of the receiver.

The receiving system is connected to the dipole 24 in a similar manner as the transmitter, in that the input circuit of the receiver is fed from the transmission line 30, the inner conductor 31 of which terminates in the loop 32, electromagnetically coupled to the inner conductor 28 of the junction 3. The receiver circuit may have a variety of forms provided that, in its operation, a local oscillator is essential to receive a signal. Heterodyne or superheterodyne circuits may be used. The conventional components of such a receiver are shown in block diagrams since the invention herein described does not pertain to the circuits so indicated. The receiver may have a mixer stage followed by an intermediate frequency amplifier, the output of which is fed to a detector and the latter supplies a suitable translating device which may take various forms, depending upon the ultimate function of the receiving system. The translating device may, for example, be a cathode-ray oscilloscope if the system is used for radar work. To the mixer circuit is coupled the output of a local oscillator, which in ultra-high frequency systems, may be a Klystron converter, as shown here schematically by the converter 35 which is of the reflex type, comprising the cathode 36, the anode 37 in the form of a cavity resonator, and a reflector electrode 38. The coupling may be effected by a transmission line 39 coupled by means of the looped inner conductor 40 to the anode 37, as well as to the mixer stage. Operating voltages for the converter are indicated by way of example by the batteries 41 and 42, the former supplying the anode 37 and the latter the reflex electrode 38, the potential of which is negative with respect to the cathode 36. The circuit of the reflex electrode 38 includes the radio frequency choke 43, which forms an impedance in order to obtain control of the oscillator upon operation of the transmitter, as will be explained hereinafter. The reflex electrode 38 is also connected at the junction of the choke 43, through a suitable capacity 45, to a point on the load resistor 20 of the control tube 17.

The operation of superheterodyne receivers is well known to those skilled in the art, and it will suffice to state briefly that, in order to receive a signal, it is essential that the frequency of the local oscillator shall have such a value that when combined with the frequency of the signal to be received in the mixer circuit, the resultant difference frequency will be the frequency to which the intermediate frequency amplifier is responsive. If the difference frequency produced is outside of the response range of the intermediate frequency amplifier, no signal will be amplified thereby, and no signal will be transmitted to the detector. In other words, the receiver will be inoperative unless the frequency of the local oscillator is properly adjusted to produce the desired intermediate frequency. In the system herein described, the receiver must be responsive to a signal of the same frequency as that of the transmitter, since the purpose is to receive the echo e. g. the reflected signal from the transmitter immediately upon cessation of transmission.

It is characteristic of Klystron converters of the reflex type that the output frequency bears a relation to the potential applied to the reflex electrode, and that this frequency may be varied within certain limits by varying the potential so applied. In the receiving system, the reflex Klystron 35 functions as the local oscillator and the reflex electrode 38 must be held at a certain potential in order that the output frequency of the converter 35 shall have the proper value to produce in the mixer the intermediate frequency to which the intermediate frequency amplifier is responsive, in order to receive a signal arriving at the dipole 24 at the frequency sent out by the transmitter. If the bias potential applied to the reflector electrode 38 is changed, the output frequency of the converter 35 will also change from the predetermined value to produce the required difference frequency. It may be noted that if sufficient bias change is provided, the oscillations of the local oscillator will cease altogether, providing positive cutoff of the production by the mixer of intermediate frequency.

In the operation of the system, while the transmitter is energized, radiation in space is effected by the dipole 24, whereas when the transmitter is not energized, the dipole 24 automatically serves as the receiving antenna for the receiving system. Obviously, since the frequency of operation for transmission as well as reception is the same, it is highly undesirable that the receiver shall be in receptive condition while the transmitter is energized. The reason for this is that the comparatively high power of the transmitter with respect to the power of the incoming signal would overload the receiving system to such an extent as to not only endanger certain components thereof, but also, due to the strong signal, would adversely affect various circuits of the receiver. This manifests in blocking the receiver for further operation until circuits of various time constants are given satisfactory time to recover, after which the receiver is again restored to an operative state. While in many cases the recovery time may be only a fraction of a second, in most radar applications the time during which the transmitter is deenergized is of such short duration that it will not allow the blocked receiver to be in a state of receptive condition by the time the echo signal arrives at the input circuit thereof. For this reason, and for those stated above, it is essential that, while the transmitter is in operation, the receiver shall not be affected by the signal output of the transmitter. It is also essential that the blocking of the receiver shall have no appreciable time constant. Consequently, the receiver control must operate in a portion of the receiver circuit which will not introduce an undesirable condition requiring a time element in the restoring of the receiver.

A control fulfilling this requirement is provided in accordance with this invention by the simple means which effectively control the frequency of the local oscillator at a time when the transmitter is in operation. Since the tuning of the local oscillator may be effected by a change in voltage of the reflux electrode 38, the coupling provided by the capacity 45 to the load resistor 20 will cause the effective voltage of the reflex electrode 38 to change when current flows through the load resistor 20 of the tube 17. The energizing potential for the transmitter, as stated before, is derived from the voltage drop produced across the resistor 20. Therefore, at the instant when power is applied to the transmitter, namely, to the Klystron converter 1 in the transmitting circuit, a portion of the voltage will be applied in the form of a charge on the condenser 45 to the reflector electrode 38 causing a potential drop across the impedance provided by the choke 43. The change of the oscillator frequency from the normal operating value, due to the potential applied to the reflex electrode 38 from the power supply circuit of the transmitter, is sufficient to produce a difference frequency in the mixer which is removed from the response range of the intermediate frequency amplifier. In this manner, the receiver becomes effectively inoperative while the transmitter is in operation. It must be born in mind that control of the transmitter may be effected at a very high rate and the control of the local oscillator at such high rate is in the form of a pulse applied to the reflex electrode 38. The circuit including the choke 43, the condenser 45 and the load resistor 20, is capable to follow the pulse rate with sufficient rapidity that the oscillator 35 is restored to the original operating frequency in sufficient time to receive the echo signal at any instant when the transmitter is inoperative. The only time element in the control circuit herein presented is in the components aforementioned, namely, the resistor 20, the capacitor 45, and the choke 43, the time constant of which may be made sufficiently low not to introduce undesirable time lag, whereas ordinarily, the circuits including the intermediate frequency amplifier and the detector of the receiver would have inherently a higher time constant. Control of these circuits, therefore, is impractical at the time rate required for the system to operate in the manner described.

The control voltage applied to the reflex electrode may be adjusted to any suitable value and if it is sufficiently high the local oscillator of the receiver may be made to cease oscillations completely at times when the transmitter is energized.

I claim as my invention:

1. In a high frequency system, a high frequency transmitter, a receiver responsive under normal operation to energy at substantially the operating frequency of said transmitter and susceptible to be adversely affected thereby, said receiver including a local oscillator, means for preventing the adverse effect upon said receiver during operation of said transmitter comprising means for changing the frequency of said local oscillator automatically upon operation of said transmitter.

2. In a high frequency system, a high frequency transmitter, a receiver of the superheterodyne type responsive under normal operation to energy at substantially the operating frequency of said transmitter and susceptible to be adversely affected thereby, said receiver including a local oscillator and a mixer in which said oscillator produces an intermediate frequency, a circuit responsive to said intermediate frequency, and means for preventing the adverse effect upon said receiver during operation of said transmitter including means for producing an intermediate frequency beyond the response range of said circuit while said transmitter is in operation.

3. In a high frequency system, a high frequency transmitter, a receiver of the superheterodyne type responsive under normal operation to energy at substantially the operating frequency of said transmitter and susceptible to be adversely affected thereby, said receiver including a local oscillator and a mixer in which said oscillator produces an intermediate frequency, means for preventing the adverse effect upon said receiver during operation of said transmitter including means for producing a frequency other than said intermediate frequency in said mixer while said transmitter is in operation.

4. In a high frequency system, a high frequency transmitter, a receiver adversely affected by the operation of said transmitter, a local oscillator in said receiver, means for changing the frequency of said oscillator, means operable upon energization of said transmitter for controlling said frequency changing means whereby upon operation of said transmitter the frequency of said oscillator is changed, said means operable to restore the frequency of said oscillator upon an inoperative condition of said transmitter.

5. In a high frequency system, a high frequency transmitter, a receiver adversely affected by the operation of said transmitter, a local oscillator in said receiver comprising an electron discharge device whose operating elements include at least one electrode, the operating potential of which controls the frequency of the oscillations generated by said device, control means operable upon energization of said transmitter for applying a control potential to said electrode whereby the frequency of said oscillator is changed while said transmitter is in operation.

6. A system in accordance with claim 5 wherein said electron discharge device is a velocity-actuated converter of the reflex type and said electrode the reflector electrode of said converter.

DAVID R. TASHJIAN.

Disclaimer 2,412,935.—*David R. Tashjian*, Baltimore, Md.—SYSTEM FOR CONTROL OF RECEIVER RECEPTION BY AN ASSOCIATED TRANSMITTER. Patent dated Dec. 17, 1946. Disclaimer filed Feb. 18, 1949, by the assignee, *Westinghouse Electric Corporation*.

Hereby enters this disclaimer to claim 3 of said patent.

[*Official Gazette March 22, 1949.*]